United States Patent [19]
Vine

[11] Patent Number: 5,471,781
[45] Date of Patent: Dec. 5, 1995

[54] MOUSE TRAP

[76] Inventor: Henry E. Vine, 1050 N. Broadway, Sheridan, Wyo. 82801-3045

[21] Appl. No.: 314,138

[22] Filed: Sep. 28, 1994

[51] Int. Cl.$^6$ .................................................. A01M 23/04
[52] U.S. Cl. ............................................................... 43/69
[58] Field of Search .................................... 43/69, 70, 73, 43/71, 72, 74

[56] References Cited

U.S. PATENT DOCUMENTS 2,168,065  8/1939  Heldinger ........................................ 43/69
2,218,403  10/1940  McKee ............................................ 43/69
2,463,839  3/1949  Wilson ............................................ 43/69
3,936,972  2/1976  Meyers et al. .................................. 43/69

Primary Examiner—P. Austin Bradley
Assistant Examiner—Jeanne M. Elpel

[57] ABSTRACT

A trap for capturing mice or other rodents. The inventive device includes a main body having an entrance ramp leading thereinto. A bait container is positioned within the main body to attract a mouse towards a pivotally mounted trap door. A holding compartment positioned beneath the trap door receives the mouse within a removable drawer. The drawer includes an insertable screen which permits removal of the drawer and transport of the mouse to an exterior area for release thereof.

3 Claims, 4 Drawing Sheets

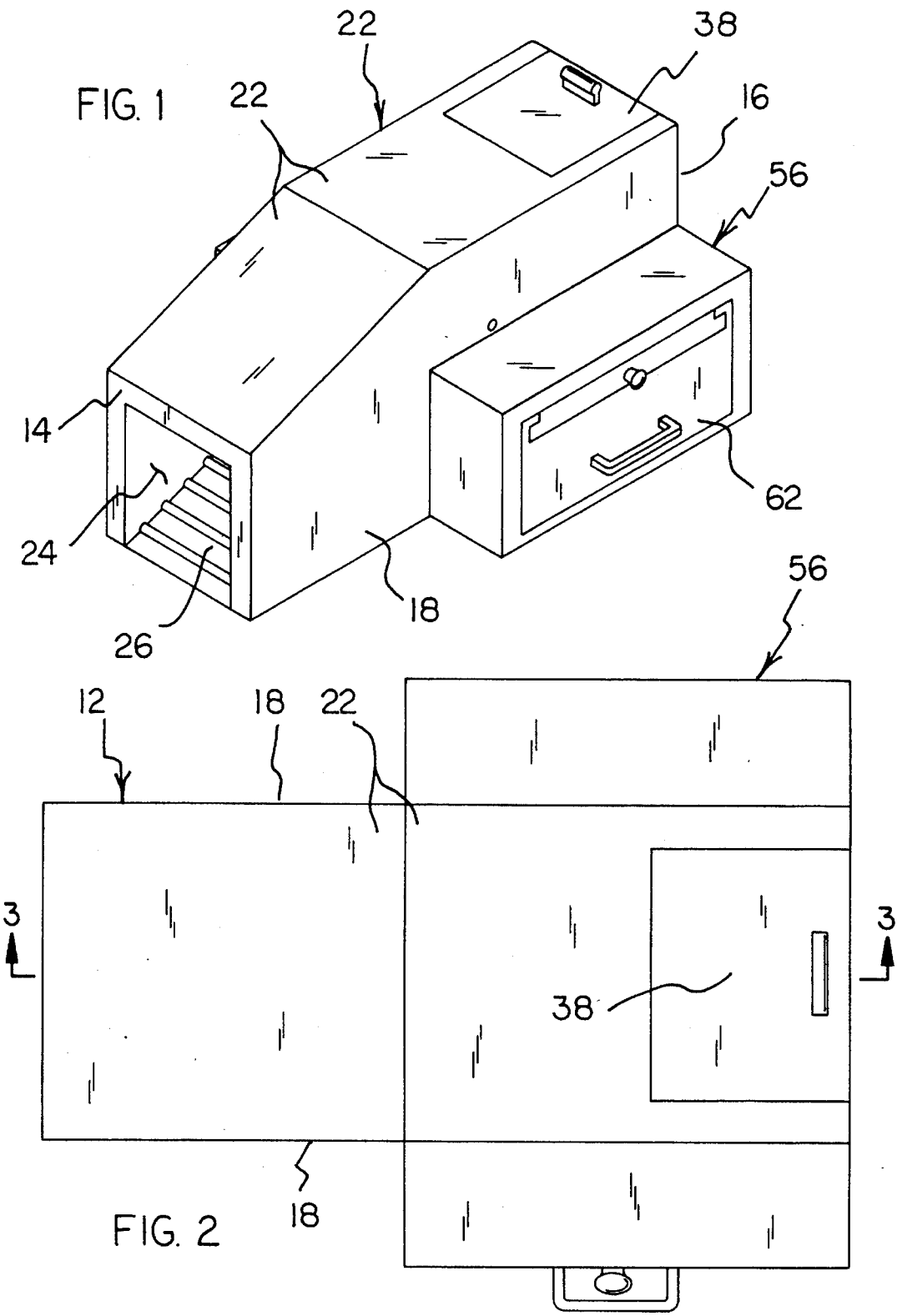

MOUSE TRAP

BACKGROUND OF THE INVENTION

1. Field of the Invention

The present invention relates to trap structures and more particularly pertains to a mouse trap for capturing mice or other rodents.

2. Description of the Prior Art

The use of trap structures is known in the prior art. More specifically, trap structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art trap structures include U.S. Pat. Nos. 4,662,101; 4,241,531; 4,154,016; 3,778,923; and 3,423,870.

While these devices fulfill their respective, particular objectives and requirements, the aforementioned patents do not disclose a mouse trap for capturing mice which includes a main body having an entrance ramp leading thereinto, a bait container positioned within the main body to attract a mouse towards a pivotally mounted trap door, and a holding compartment positioned beneath the trap door for receiving the mouse within a removable drawer. Furthermore, none of the known prior art trap structures teach or suggest a mouse trap of the aforementioned structure which further includes a removable screen which may be coupled to the drawer to permit removal of the drawer from the holding compartment and transport of the mouse to an exterior area for release thereof.

In these respects, the mouse trap according to the present invention substantially departs from the conventional concepts and designs of the prior art, and in so doing provides an apparatus primarily developed for the purpose of capturing mice or other rodents.

SUMMARY OF THE INVENTION

In view of the foregoing disadvantages inherent in the known types of trap structures now present in the prior art, the present invention provides a new mouse trap construction wherein the same can be utilized for capturing mice. As such, the general purpose of the present invention, which will be described subsequently in greater detail, is to provide a new mouse trap apparatus and method which has many of the advantages of the trap structures mentioned heretofore and many novel features that result in a mouse trap which is not anticipated, rendered obvious, suggested, or even implied by any of the prior art trap structures, either alone or in any combination thereof.

To attain this, the present invention generally comprises a trap for capturing mice or other rodents. The inventive device includes a main body having an entrance ramp leading thereinto. A bait container is positioned within the main body to attract a mouse towards a pivotally mounted trap door. A holding compartment positioned beneath the trap door receives the mouse within a removable drawer. The drawer includes an insertable screen which permits removal of the drawer and transport of the mouse to an exterior area for release thereof.

It is therefore an object of the present invention to provide a new mouse trap apparatus and method which has many of the advantages of the trap structures mentioned heretofore and many novel features that result in a mouse trap which is not anticipated, rendered obvious, suggested, or even implied by any of the prior art trap structures, either alone or in any combination thereof.

It is another object of the present invention to provide a new mouse trap which may be easily and efficiently manufactured and marketed.

It is a further object of the present invention to provide a new mouse trap which is of a durable and reliable construction.

An even further object of the present invention is to provide a new mouse trap which is susceptible of a low cost of manufacture with regard to both materials and labor, and which accordingly is then susceptible of low prices of sale to the consuming public, thereby making such mouse traps economically available to the buying public.

Still yet another object of the present invention is to provide a new mouse trap which provides in the apparatuses and methods of the prior art some of the advantages thereof, while simultaneously overcoming some of the disadvantages normally associated therewith.

Still another object of the present invention is to provide a new mouse trap for removably capturing mice or other rodents within a transportable drawer.

Yet another object of the present invention is to provide a new mouse trap which includes a main body having an entrance ramp leading thereinto, a bait container positioned within the main body to attract a mouse towards a pivotally mounted trap door, and a holding compartment positioned beneath the trap door for receiving the mouse within a removable drawer.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a isometric illustration of a mouse trap according to the present invention.

FIG. 2 is a top plan view thereof.

DESCRIPTION OF THE PREFERRED EMBODIMENT

Figure 3:
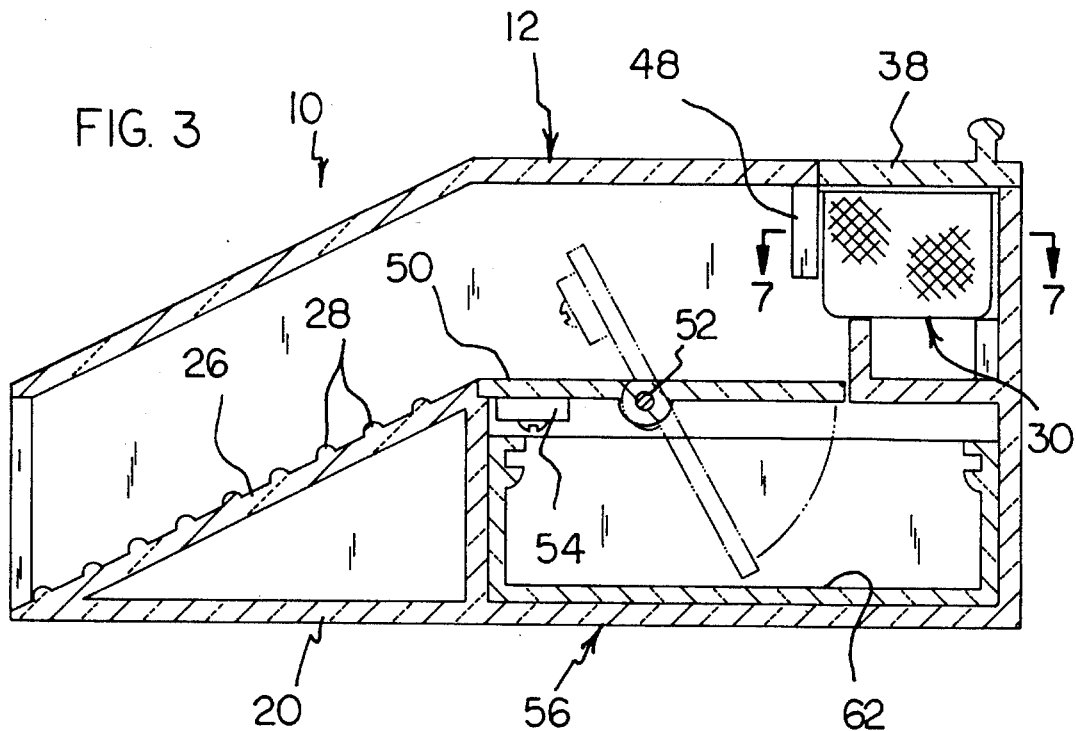
FIG. 3 is a cross sectional view taken along line 3—3 of FIG. 2.

With reference now to the drawings, and in particular to FIGS. 1–8 thereof, a new mouse trap embodying the principles and concepts of the present invention and generally designated by the reference numeral 10 will be described.

More specifically, it will be noted that the mouse trap 10 comprises a main body 12 having a front wall 14 spaced from a rear wall 16, with a pair of side walls 18 extending orthogonally between the front and rear walls. A bottom wall 20 extends orthogonally between the front and rear walls 14, 16, as well as the side walls 18, as shown in FIG. 3. The main body 12 is completed by an angled top wall 22 as shown in FIG. 1. The front wall 14 of the main body 12 includes an entrance opening 24 which permits access by a mouse or other rodent to an interior of the main body 12. To this end, a ramp 26 extends from the entrance opening 24 at an oblique angle relative to the bottom wall 20 to a position spaced above the bottom wall, as shown in FIG. 3. The ramp 26 includes a plurality of parallel and spaced linear projections 28 which permit the mouse or rodent to easily climb the ramp.

Figure 5:
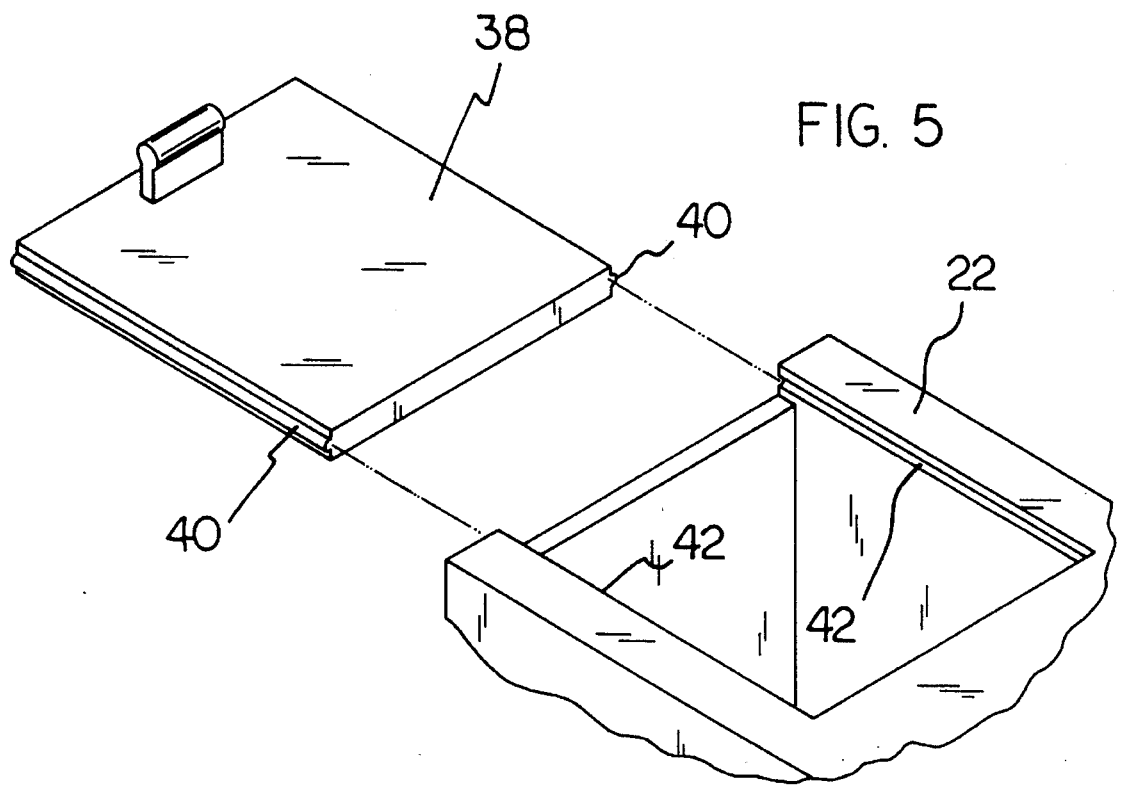
FIG. 5 is an enlarged isometric illustration, partially exploded, of a further portion of the present invention.
Figure 6:
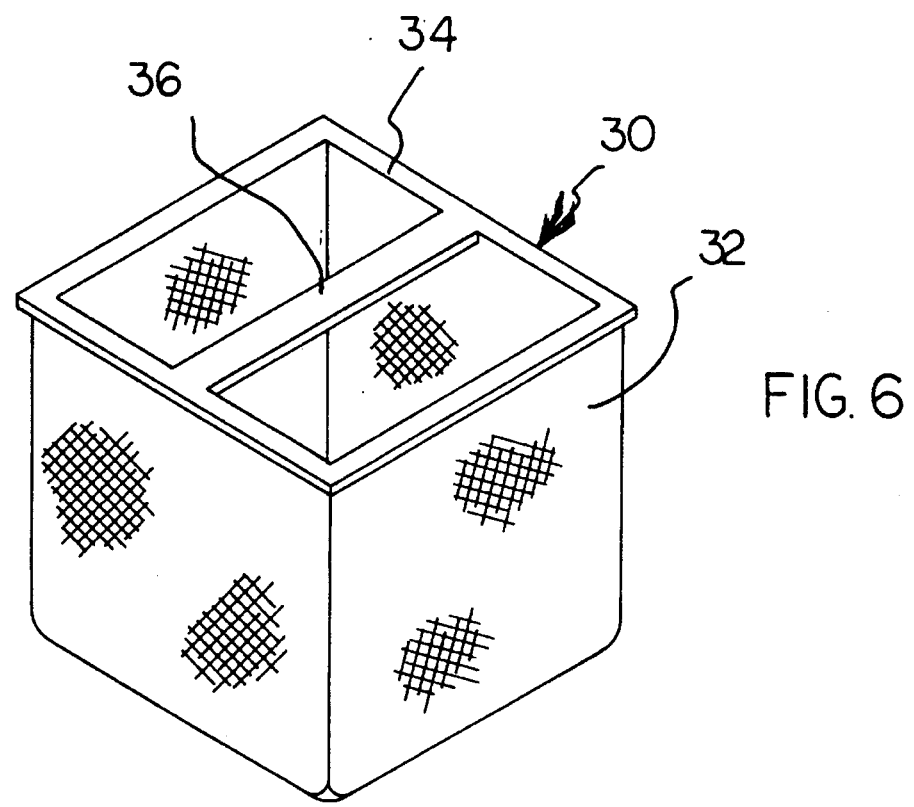
FIG. 6 is an enlarged isometric illustration of a bait container comprising a portion of the present invention.

To attract the mouse into the main body 12, a bait container 30 is removably positioned within the interior of the main body proximal to the rear wall 16 thereof. The bait container 30, as shown in FIG. 6, comprises a substantially rectangular mesh bag 32 having an open upper end with a bag frame 34 extending along and coupled to the upper edge of the open end of the mesh bag. A center handle 36 extends across the bag frame 34 and permit manual manipulation of the bait container 30 during the use of the device 10. As best shown in FIGS. 3 and 5, the bait container 30 is positionable within the main body 12 beneath a removable access door 38 through a rectangular aperture in the top wall 22. The access door 38 is correspondingly shaped relative to the rectangular aperture in the top wall 22 and includes a pair of access door longitudinal projections 40 extending along the closed sides thereof which slidably engage correspondingly shaped top wall grooves 42 formed within the top wall. To support the bait container 30 within the main body 12, a support wall 44 orthogonally extends between interior surfaces of the opposed side walls 18 and cooperates with a pair of support stanchions 46 to support the bait container 30 at a lower end thereof. Preferably, the mesh bag 32 of the bait container 30 is formed of substantially rigid wire screen material, wherein gravitational deformation of the bait container 30 as a result of being supported at a bottom end thereof is precluded. Further, a pair of guide members 48 extend vertically along interior surfaces of the opposed side walls 18 and cooperate to align the bait container 30 relative to the support wall 44 and the support stanchions 46.

Figure 7:
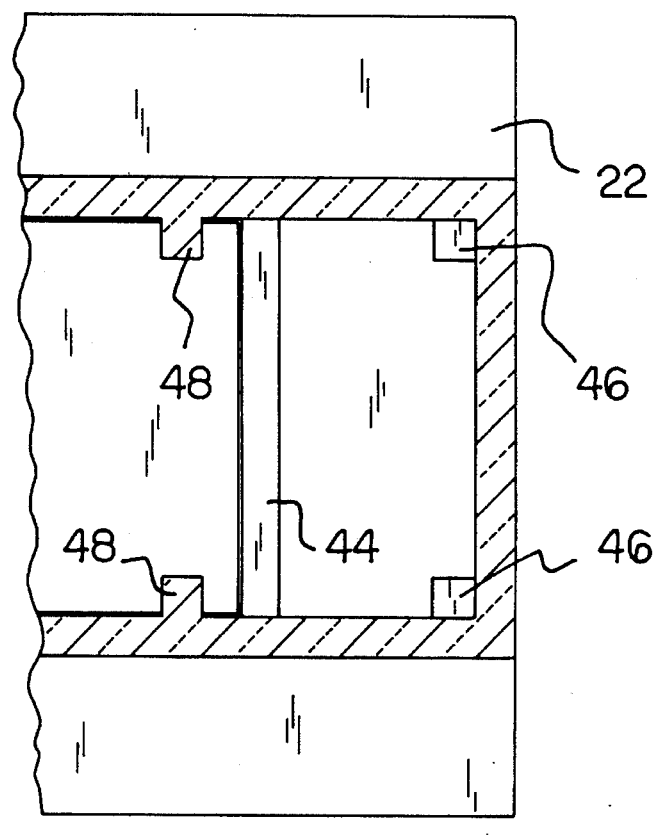
FIG. 7 is a cross sectional view taken along line 7—7 of FIG. 3.
Figure 8:
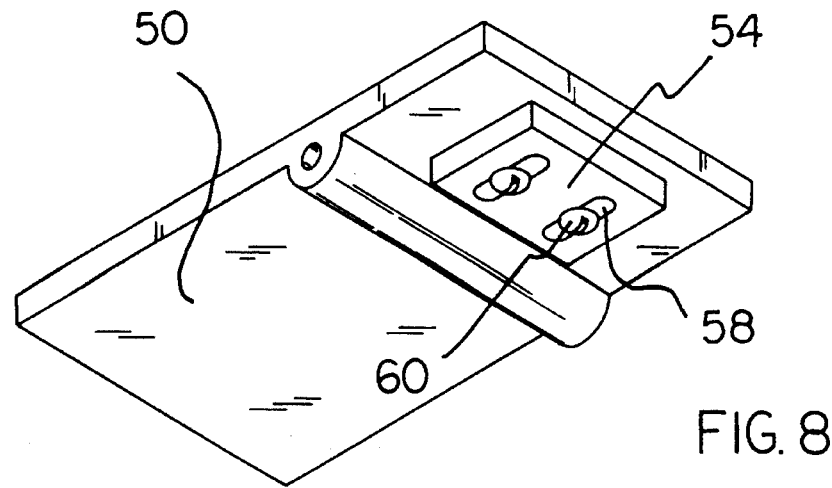
FIG. 8 is an isometric illustration of a trap door of the present invention.

As best illustrated in FIG. 3, a trap door 50 is pivotally mounted on an axle 52 extending between the side walls 18 within the main body 12. The trap door 50 includes an adjustably mounted counter weight 54 which serves to gravitationally bias the trap door 50 into a substantially horizontal orientation engaged to an upper end of the ramp 26. However, upon receiving the weight of the mouse onto the portion of the trap door 50 between the axle 52 and the bait container 30, the trap door will rotate into the position illustrated in phantom in FIG. 3 to deposit the mouse within a holding compartment 56 positioned therebeneath. As shown in FIG. 7, the counter-weight 54 includes at least one elongated aperture 58 and is secured to a lower surface of the trap door 50 by at least one threaded fastener 60. By this structure, the counter-weight 54 can be adjusted relative to the axle 52 to calibrate the device 10 to a particular mouse weight.

Figure 4:
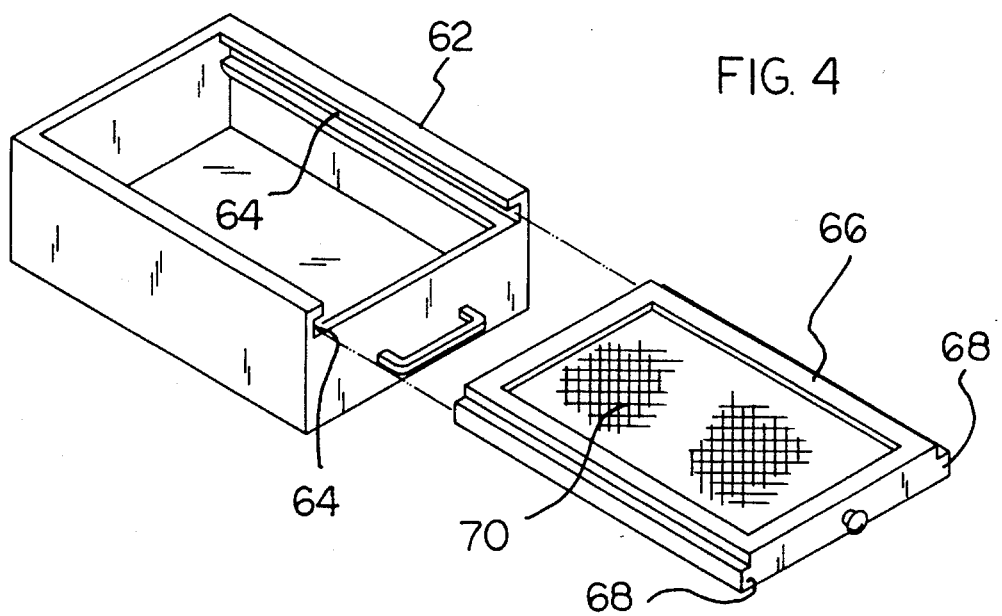
FIG. 4 is a isometric illustration of a portion of the present invention.

Referring now to FIGS. 1 and 4, it can be shown that the holding compartment 56 extends through the side walls 18 of the main body 12 and slidably receives a drawer 62 therewithin. The drawer 62 includes a pair of spaced, longitudinally extending tracks 64 which receive a screen frame 66 having correspondingly shaped longitudinal projections 68. A screen 70 is supported by the screen frame 66 and serves to preclude an escape of the mouse from the drawer 62 when the drawer is removed from the holding compartment 56.

In use, the present invention 10 can be utilized to removably capture a mouse or other rodent within the drawer 62 of the holding compartment 56 by simply placing an attractive substance within the bait container 30. The mouse or other rodent entering the main body 12 will climb the ramp 26 and attempt to access the substance within the bait container 30, whereby a positioning of the mouse between the axle 52 and the bait container 30 will result in a pivoting of the trap door 50, as shown in FIG. 3 and subsequent depositing of the mouse within the drawer 62 of the holding compartment 56. If desired, oil or other slick substances may be applied to an upper surface of the trap door 50 to facilitate reduced friction and increased tendency of the mouse to slide relative to the trap door. After depositing of the mouse within the drawer 62, the screen frame 66 and the associated screen 70 can be positioned within the track 64 of the drawer 62 to removably capture the mouse within the drawer. The drawer 62 can then be removed relative to the holding compartment 56 and transported to an exterior area for release of the mouse or other rodent contained therein. Alternatively, a poisonous fluid or the like may be positioned within the drawer 62, whereby the mouse will be humanly destroyed upon falling into the holding compartment 56.

What is claimed as being new and desired to be protected by Letters Patent of the United States is as follows:

1. A mouse trap comprising:

a main body having a front wall including an entrance opening which permits access by a mouse to an interior of said main body;

a ramp extending from said entrance opening at an oblique angle relative to a bottom wall of said main body to a position spaced above said bottom wall;

a bait container removably positioned within said interior of said main body proximal to a rear wall thereof;

a trap door pivotally mounted within said main body, said trap door including an adjustably mounted counter weight which serves to gravitationally bias said trap door into a substantially horizontal orientation engaged to an upper end of said ramp; and, a holding compartment positioned beneath said trap door, wherein said trap door, upon receiving a weight of said mouse onto a portion of said trap door will rotate to deposit said mouse within said holding compartment wherein said holding compartment extends through side walls of said main body and includes a drawer slidably received therewithin; and further comprising screen means for selectively closing an upper opening of said drawer.

2. The mouse trap of claim 1, wherein said drawer includes a pair of spaced, longitudinally extending tracks, and further wherein said screen means comprises a screen frame having longitudinal projections correspondingly shaped relative to said tracks, said screen frame being engagable to said drawer when said drawer is within said holding compartment; and a screen supported by said screen frame for precluding an escape of said mouse from said drawer when said drawer is removed from said holding compartment.

3. A mouse trap comprising:

a main body having a front wall including an entrance opening which permits access by a mouse to an interior of said main body;

a ramp extends from said entrance opening at an oblique angle relative to a bottom wall of said main body to a position spaced above said bottom wall, said ramp including a plurality of parallel and spaced linear projections which permit said mouse to easily climb said ramp;

a bait container removably positioned within said interior of said main body proximal to a rear wall thereof, said bait container comprising a substantially rectangular mesh bag having an open upper end with a bag frame extending along and coupled to an upper edge of said open end of said mesh bag, and a center handle extending across said bag frame;

a trap door pivotally mounted within said main body, said trap door including an adjustably mounted counter weight which serves to gravitationally bias said trap door into a substantially horizontal orientation engaged to an upper end of said ramp;

a holding compartment positioned beneath said trap door, wherein said trap door, upon receiving a weight of said mouse onto a portion of said trap door will rotate to deposit said mouse within said holding compartment, said holding compartment extending through side walls of said main body and includes a drawer slidably received therewithin, said drawer including a pair of spaced, longitudinally extending tracks; and, screen means for selectively closing an upper opening of said drawer, said screen means comprising a screen frame having longitudinal projections correspondingly shaped relative to said tracks, said screen frame being engagable to said drawer when said drawer is within said holding compartment; and a screen supported by said screen frame for precluding an escape of said mouse from said drawer when said drawer is removed from said holding compartment.

* * * * *